(12) United States Patent
Peterson

(10) Patent No.: US 8,397,699 B2
(45) Date of Patent: Mar. 19, 2013

(54) FUEL PRETREATER

(76) Inventor: Raymond L. Peterson, West Valley, UT (US)

( * ) Notice: Subject to any disclaimer, the term of this patent is extended or adjusted under 35 U.S.C. 154(b) by 306 days.

(21) Appl. No.: 12/939,910

(22) Filed: Nov. 4, 2010

(65) Prior Publication Data

US 2011/0108011 A1    May 12, 2011

Related U.S. Application Data

(60) Provisional application No. 61/258,795, filed on Nov. 6, 2009.

(51) Int. Cl.
*F02M 27/02* (2006.01)

(52) U.S. Cl. ........................... 123/538; 123/557

(58) Field of Classification Search .......... 123/543–557, 123/536–538
See application file for complete search history.

(56) References Cited

U.S. PATENT DOCUMENTS

| | | | |
|---|---|---|---|
| 4,505,250 A | 3/1985 | Hada et al. | |
| 5,794,601 A | 8/1998 | Pantone | |
| 6,993,979 B2 | 2/2006 | Segeral | |
| 7,104,224 B2 | 9/2006 | Jonson | |
| 7,194,984 B2 * | 3/2007 | Jonson | 123/1 A |
| 7,469,688 B2 * | 12/2008 | Jonson et al. | 123/531 |
| 7,487,764 B2 * | 2/2009 | Lee | 123/538 |
| 7,934,489 B2 * | 5/2011 | Jonson | 123/538 |
| 2008/0041350 A1 | 2/2008 | Lee | |

OTHER PUBLICATIONS

Geet-Global Environment Energy Technology, "Single Auto Conversion Plans", 1998-2001, pp. 1-17.

* cited by examiner

*Primary Examiner* — M. McMahon
(74) *Attorney, Agent, or Firm* — Thorpe North & Western LLP

(57) ABSTRACT

A fuel pretreater apparatus for pretreating fuel for combustion is provided. A conversion tube is provided for vaporized fuel to flow therethrough. The conversion tube includes an intake end for receiving the vaporized fuel and an outlet end for dispersing the vaporized fuel. The conversion tube includes a hollow tapered interior wall having a narrower diameter near the intake end and a wider diameter near the outlet end. A tapered conversion rod is removably placed inside the conversion tube. The tapered conversion rod is conically tapered along at least one half of a length of the tapered conversion rod. The tapered conversion rod includes a narrow end corresponding to the narrower diameter of the conversion tube near the intake end and a wide end corresponding to the wider diameter of the conversion tube near the outlet end.

12 Claims, 4 Drawing Sheets

FUEL PRETREATER

PRIORITY CLAIM

Priority is claimed to copending U.S. Provisional Patent Application Ser. No. 61/258,795, filed Nov. 6, 2009, which is hereby incorporated herein by reference in its entirety.

BACKGROUND

In fuel burning apparatuses and internal combustion engines, combustion of a fuel generally occurs with an oxidizer, such as air, in a combustion chamber. Expansion of the high temperature/pressure gases produced by the combustion can directly apply force to a movable component of the engine, such as pistons or turbine blades and generate useful mechanical energy.

A large number of different designs for combustion engines have been developed and built, with a variety of different strengths and weaknesses. Most combustion engines are designed to burn a particular fuel in a particular state or phase of matter. For example, internal combustion engines may be designed to burn gasoline or diesel fuel. Furnaces or boilers often burn natural gas, oil, or coal. Some engines use the fuel as a liquid, some use the fuel as a gas, or vapor.

Some fuel burning apparatuses have been developed which treat fuel before combustion. Such treatment devices are sometimes called fuel pretreaters and may treat the fuel in a variety of ways, such as vaporizing a liquid fuel, heating the fuel, mixing the fuel, etc. Pretreating fuel prior to combustion can serve to increase efficiency of converting energy in the fuel into work which can be performed by the fuel burning apparatus. Improving fuel efficiency even marginally can result in substantial fuel savings over a period of time. Improved fuel efficiency can also provide environmental benefits. Using less fuel can result in fewer harmful emissions to the atmosphere. Exhaust from fuel burning engines can be cleaned to reduce harmful emissions as well.

Despite the wide variety of fuel burning apparatuses, engines, and the like, prior devices still often are unacceptably inefficient or produce an unacceptable amount of harmful emissions. Combustion devices have been developed which are able to reduce harmful emissions and increase fuel efficiency.

SUMMARY

A fuel pretreater apparatus for pretreating fuel for combustion is provided. A conversion tube is provided for vaporized fuel to flow therethrough. The conversion tube includes an intake end for receiving the vaporized fuel and an outlet end for dispersing the vaporized fuel. The conversion tube includes a hollow tapered interior wall having a narrower diameter near the intake end and a wider diameter near the outlet end. A tapered conversion rod can be removably placed inside the conversion tube. The tapered conversion rod is conically tapered along at least one half of a length of the tapered conversion rod. The tapered conversion rod includes a narrow end corresponding to the narrower diameter of the conversion tube near the intake end and a wide end corresponding to the wider diameter of the conversion tube near the outlet end.

In accordance with another embodiment, a fuel pretreater apparatus for pretreating fuel for combustion is provided which includes a combustion engine. A fuel source is in fluid communication with the combustion engine. A fuel vaporizer can vaporize fuel from the fuel source. An exhaust pipe can provide an outlet for exhaust from fuel combusted in the combustion engine. A conversion tube can extend through the exhaust pipe such that when heated exhaust passes through the exhaust pipe the conversion tube is heated. The conversion tube can receive vaporized fuel from the fuel source. The conversion tube includes an intake end for receiving the vaporized fuel and an outlet end for dispersing the vaporized fuel. The conversion tube includes a hollow tapered interior wall having a narrower diameter near the intake end and a wider diameter near the outlet end. A tapered conversion rod can be removably placed inside the conversion tube. The tapered conversion rod is conically tapered along at least one half of a length of the tapered conversion rod. The tapered conversion rod includes a narrow end corresponding to the narrower diameter of the conversion tube near the intake end and a wide end corresponding to the wider diameter of the conversion tube near the outlet end.

In accordance with another embodiment, a method is provided for pretreating fuel for combustion. The method can include receiving fuel at a fuel vaporizer from a fuel source in fluid communication with a combustion engine. The fuel can then be vaporized using the fuel vaporizer to obtain vaporized fuel. The vaporized fuel can subsequently be flowed into a conversion tube surrounded by an exhaust pipe. The vaporized fuel can be caused to flow circularly around a tapered conversion rod in the conversion tube. The method can also include converting the vaporized fuel into treated vaporized fuel using a plasma creation process in the conversion tube.

DETAILED DESCRIPTION

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

An engine can be provided in which exhaust heat can be transferred to incoming fuel, which can be in a vacuum or a partial vacuum. The engine configuration can result in a molecular breakdown of the fuel within the partial vacuum. The speed of molecular breakdown can be greater than that found in other types of devices. The engine includes a fuel processor or fuel pretreater. The engine fuel pretreater treats vaporized fuel for combustion by creating plasma from the fuel using a dual vortex. The nature of dual vortices has been described in various publications. For example, research has been performed on opposite electrical charges, which research suggests that a positive charge circulation and a negative charge circulation can induce a centripetal inner vortex surrounded by an outer circulation connected by a Mobius twist. Other dual vortices have been described, such as an implosion dual vortex using water which manifests an anomalously energetic effect. Propulsive gains have been measured in the implosion dual vortex. In summary, circulating charged matter or plasma in a dual vortex flow can manifest a resonant form of energetic or propulsive gains.

In the engine fuel pretreater, an intake pipe is configured to guide vaporized fuel into a vortex due to a rod mounted centrally along the axis of the intake pipe. A concentric exhaust manifold surrounds the intake pipe and supports a vortical exhaust flow. A gap between the central steel rod and the intake pipe wall is small, which can cause at least partial ionization due to friction. Energetic gains similar to those manifested in the electrical charge and water dual vortices can also be found in the engine fuel pretreater, which energetic gains can be useful to convert fuel to plasma. The vortical fuel and exhaust flows can be at least partially induced by the different respective temperatures of fuel and the exhaust. In other words, the heat from the exhaust flowing in one direction and coming in contact with the cooler fuel flowing in an opposite direction can at least partially induce vortical flows.

Figure 1:
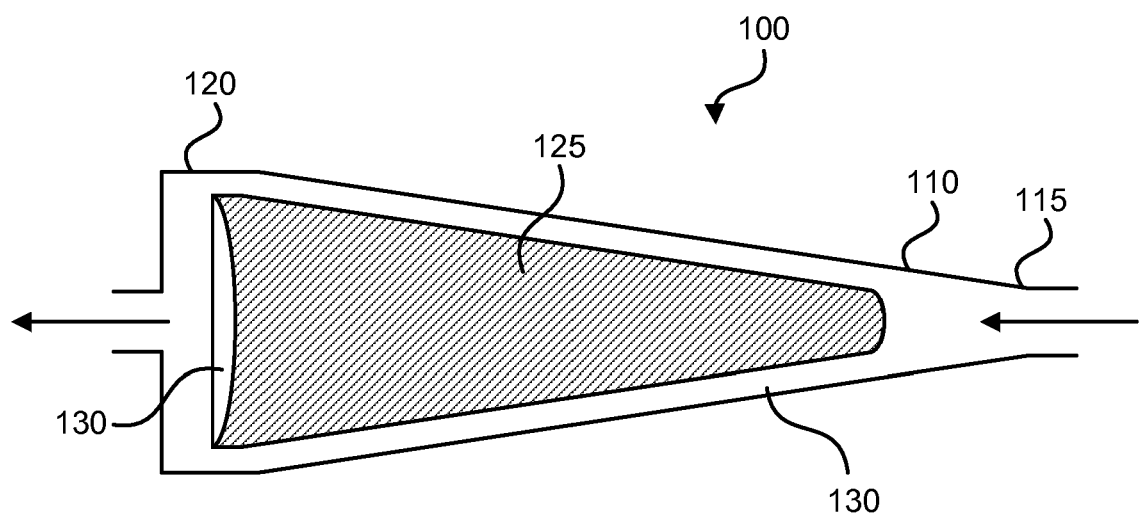
FIG. 1 is a cross-sectional side view of a fuel pretreater apparatus in accordance with an embodiment.

In accordance with an embodiment, and as shown in FIG. 1, a fuel pretreater apparatus 100 for pretreating fuel for combustion is provided. A conversion tube 110 is provided for vaporized fuel to flow therethrough. The conversion tube includes an intake end 115 for receiving the vaporized fuel and an outlet end 120 for dispersing the vaporized fuel. The conversion tube includes a hollow tapered interior wall having a narrower diameter near the intake end and a wider diameter near the outlet end. A tapered conversion rod 125 can be removably placed inside the conversion tube. The tapered conversion rod is conically tapered along at least one half of a length of the tapered conversion rod. The tapered conversion rod includes a narrow end corresponding to the narrower diameter of the conversion tube near the intake end and a wide end corresponding to the wider diameter of the conversion tube near the outlet end. In one aspect, the fuel pretreater apparatus may further comprise an exhaust conduit substantially enclosing the conversion tube such that when heated exhaust passes through the exhaust conduit the conversion tube is heated.

The fuel pretreater apparatus 100 can be configured to provide a specific flow direction of plasma being created (described below), thereby maximizing and intensifying the electromagnetic fields created and enhancing molecular or atomic, disassociation. Because of the molecular disassociation that occurs within the fuel pretreater apparatus, when the treated fuel is combusted in a combustion engine, exhaust output from the engine can be cleaner. Use of a tapered conversion rod 125 can increase the effect of molecular disassociation and the conversion process to create a more powerful fuel with cleaner exhaust. The taper can allow or create more space in the conversion tube for expansion of the fuel without creating a large void in the conversion tube which may negatively affect performance or flows of the fuel pretreater apparatus.

As will be described in further detail below, fuel can flow in one direction in the conversion tube 110, and the conversion tube can be surrounded by an exhaust pipe with exhaust flowing in an opposite direction. The exhaust can be hot and can heat the conversion tube and the fuel in the conversion tube. By flowing the fuel through the heated exhaust in an opposite direction, air and fuel (collectively "gas") masses are stimulated and shear against one another, causing the formation of electrical charges. The plasma can be formed as a result of the heat, electrical charges, pressure, velocity, and the like. Forming plasma from the fuel can convert the fuel into a cleaner fuel with fewer pollutants.

The cross-sectional view of the conversion rod of FIG. 1 shows an at least partially semi-spherical depression 130 formed in one end of the conversion rod 125. When plasma is formed from the fuel, the plasma can form at the end of the conversion rod and the depression in the rod can serve to provide an expanded space for the plasma to form.

The conversion rod 125 may comprise a smooth tapered surface or may comprise a textured tapered surface. For example, the surface may include knurling, bumps, divots, depressions, grooves, ribs, etc., as may be useful to further induce vortical flows. The conversion rod can be formed from any of a variety of materials, such as steel, aluminum, copper, iron, porcelain, glass, composites, etc. The conversion rod can be tapered along an entire length of the rod or may be tapered along a portion of the rod. As shown in FIG. 1, at least a portion of the rod may be planar and not tapered. Also, the degree of tapering can vary. As shown in FIG. 1, the narrow diameter end of the conversion rod is rounded. In other aspects, the narrow diameter end can be tapered at a same or different tapering angle as a main tapered portion of the conversion rod. In one aspect, the degree of tapering of the main tapered portion is between approximately a 1.5° and 7° angle on each side, resulting in an overall total tapered angle of between approximately 3° and 14°. In one aspect, the conversion rod may be a tapered cone having a tapered angle of approximately 9° with approximately a 4.5° taper on each side of the tapered cone.

The conversion tube 110 in which the conversion rod 125 is disposed can include a tapered wall 135. The tapered wall can be tapered at substantially the same angle as the conversion rod to provide a uniform clearance between the rod and the tube along at least the main tapered portion of the conversion rod. In one aspect, the conversion tube can be approximately 1/16 inch greater in diameter than the conversion rod at any given position on the conversion tube relative to a corresponding position on the conversion rod. When the fuel pretreater apparatus is in operation, the conversion rod can "float" within the conversion tube due to the surrounding flow of fuel and due to electromagnetic forces generated by the vortical flows of the fuel and exhaust. When the conversion rod is floating within the conversion tube in a substantially central position within the conversion tube, the clearance between a tapered portion of the conversion rod and the wall of the conversion tube can be approximately 1/30 inch to 1/32 inch, which when combined with the clearance on an opposite side of the conversion rod totals the above described approximately 1/16 inch total clearance. These clearances are provided as example clearances and, in practice, the actual clearances may be smaller or greater.

While the conversion rod 125 is able to float within the conversion tube 110, before fuel flows through the conversion tube the conversion rod can rest against an inner wall of the conversion tube. As the conversion rod and at least the inside of the conversion tube are tapered, there is a possibility that the weight of the conversion rod may block fuel vapors or air from entering the conversion tube. A blocked conversion tube where air cannot flow can prevent the engine from starting normally. Although such a possibility may be remote, the conversion rod can be prevented from going too far into the conversion tube and getting wedged by including a wire, a mesh, or any other suitable device across the narrow end of the conversion tube to prevent the conversion rod from going any further into the conversion tube past the wire, mesh, etc.

The wire, mesh, or the like can be configured to enable fuel to flow freely through the conversion tube while preventing movement of the conversion rod past the wire or mesh. Alternately, a device such as a pin, a knob, or the like can be formed on the end of the conversion rod to prevent movement of the conversion rod too far into the conversion tube.

The conversion tube 110 can include a cap at the wider end, such that the conversion rod can be held in the conversion tube after insertion. For example, the cap can include threads and can be screwed onto the conversion tube. Other devices for securing the cap to the conversion tube as are commonly used for mechanically securing one device to another are also contemplated and are considered within the scope of this disclosure. The cap can also include an opening through which treated fuel can flow toward the engine.

The fuel pretreater system 100 can also include a wire mesh, such as a mesh made from stainless steel, brass, or the like, between the vaporizer and the conversion tube to prevent a fire flashback from entering the vaporizer or the fuel source. The mesh can be inserted into a pipe fitting in the gas vapor line between the vaporizer and the conversion tube.

Figure 2:
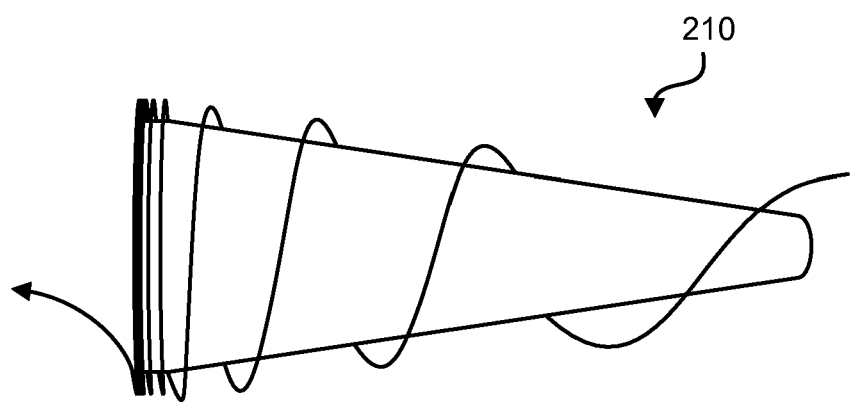
FIG. 2 is a side view of a conversion rod in accordance with an embodiment and showing a flow of vaporized fuel around the conversion rod.

The presence and configuration of the conversion rod can press fuel vapors against the heated conversion tube, where the conversion tube is heated by exhaust from the engine. FIG. 2 illustrates a spiraling effect or vortical flow of fuel vapors around the conversion rod 210. The spiraling affect or vortical flow is illustrated by the curved line circling around the conversion rod. The inventor believes that the fuel vapors spiral increasingly faster around the diameter of the conversion rod as the vapors traverse the rod from the narrow end to the wide end. More particularly, the fuel vapors can complete at least one complete spirals around the conversion rod across the length of the conversion rod. Experimental use of the conversion rod has resulted in fuel tracks marked on the rod where the spiraling action is visible. For example, a first spiral may be completed along a portion of the length of the rod, and a second spiral or portion of a spiral (as well as potentially additional spirals or spiral portions) may be started and/or completed around the conversion rod across a remaining portion of the length of the conversion rod. The result is an increasingly faster and more powerful flow of fuel as the fuel approaches the wider end of the conversion rod. Because the fuel is in contact with the heated conversion tube and performs more spirals at a hotter end of the conversion tube, the temperature of the fuel vapor can spike at the wider end of the conversion rod and plasma can be created. Because the fuel vapors spiral around the conversion rod increasingly faster, increasing a diameter of the conversion rod through tapering means that the fuel will cover a greater distance, encounter greater friction and heat, and create a more powerful conversion of the fuel from fuel vapors to treated fuel vapors. After the fuel has been converted to treated fuel vapors through the plasma creation process, the treated fuel vaporized can have a substantial amount of heat. As a result, the fuel may be allowed to at least partially cool before the fuel is provided to an intake manifold of an engine.

Figure 3:
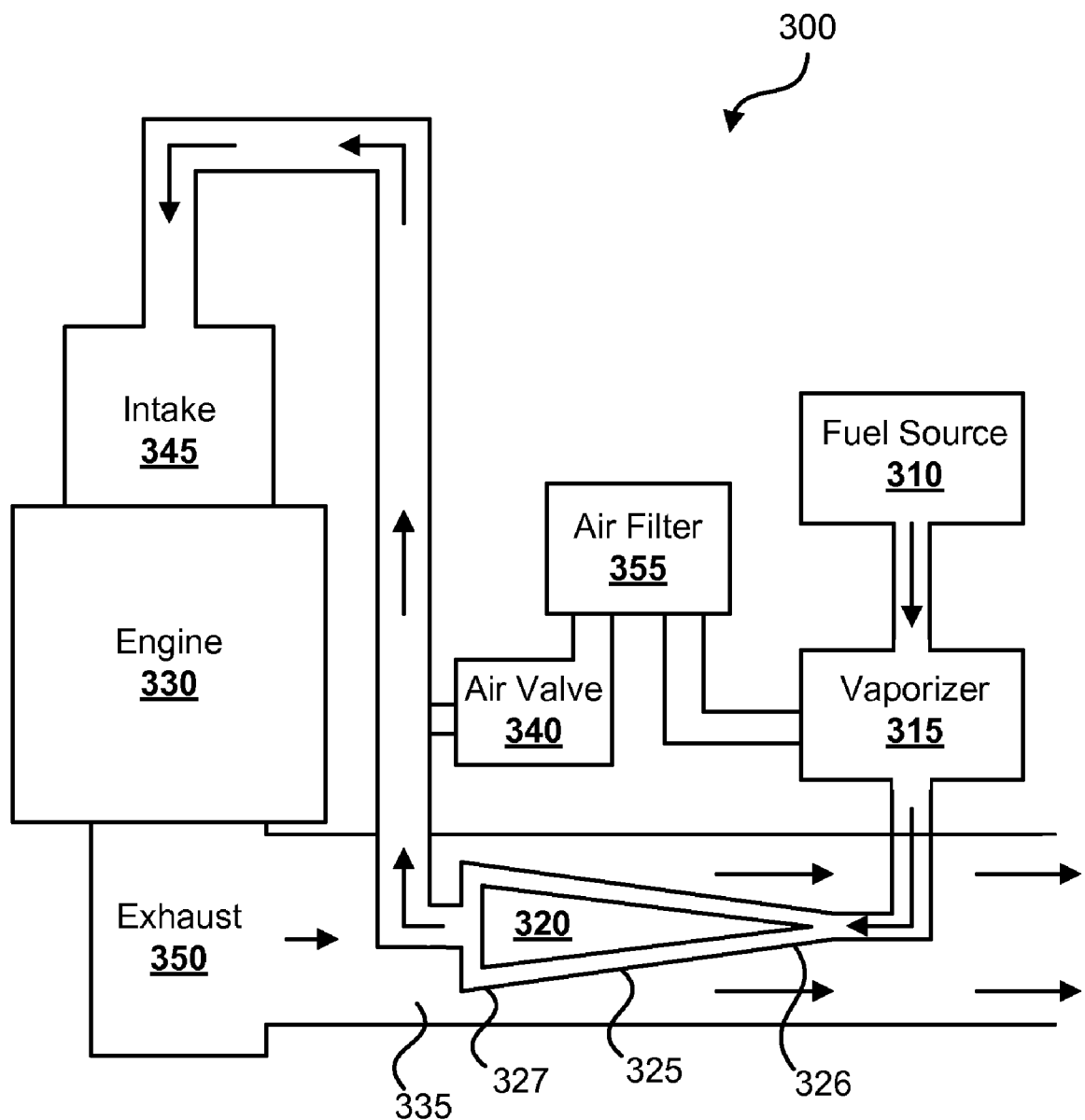
FIG. 3 is a block diagram of a fuel pretreater apparatus as part of an internal combustion engine, in accordance with an embodiment.

In accordance with another embodiment, and as shown in FIG. 3, a fuel pretreater apparatus 300 for pretreating fuel for combustion is provided which includes a combustion engine 330. A fuel source 310 is in fluid communication with the combustion engine. A fuel vaporizer 315 can vaporize fuel from the fuel source. An exhaust pipe 335 can provide an outlet for exhaust from fuel combusted in the combustion engine. A conversion tube 325 can pass through the exhaust pipe such that when heated exhaust passes through the exhaust pipe the conversion tube is heated. The conversion tube can receive vaporized fuel from the fuel source. The conversion tube includes an intake end 326 for receiving the vaporized fuel and an outlet end 327 for dispersing the vaporized fuel. The conversion tube includes a hollow tapered interior wall having a narrower diameter near the intake end and a wider diameter near the outlet end. A tapered conversion rod 320 can be removably placed inside the conversion tube. The tapered conversion rod is conically tapered along at least one half of a length of the tapered conversion rod. The tapered conversion rod includes a narrow end corresponding to the narrower diameter of the conversion tube near the intake end and a wide end corresponding to the wider diameter of the conversion tube near the outlet end. The combustion engine can receive converted fuel from the fuel pretreater apparatus through an intake manifold 345. An exhaust manifold 350 can also be connected to the engine and be configured to direct the exhaust from the engine into the exhaust pipe.

The fuel pretreater apparatus can also include an air valve 340 for metering air into the treated fuel. For example, the air valve may be a butterfly valve. In a more specific implementation, the butterfly valve can be a delayed function butterfly valve to open slower for particular implementations where slower air flow and/or mixing of air with treated or untreated fuel is desired. The air valve can receive fresh air from an air filter 355. The air filter can also supply fresh air to the vaporizer 315.

Figure 4A:
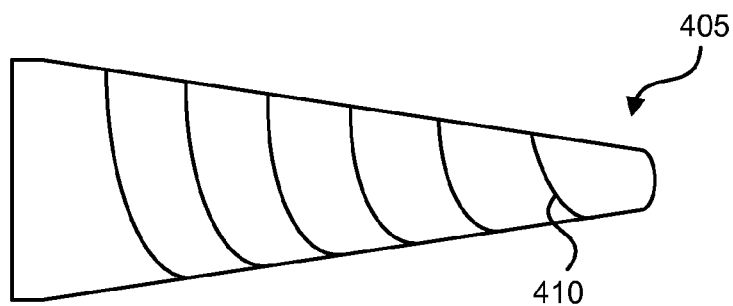
FIGS. 4a-4c are side views of tapered conversion rods in accordance with embodiments.
Figure 4B:
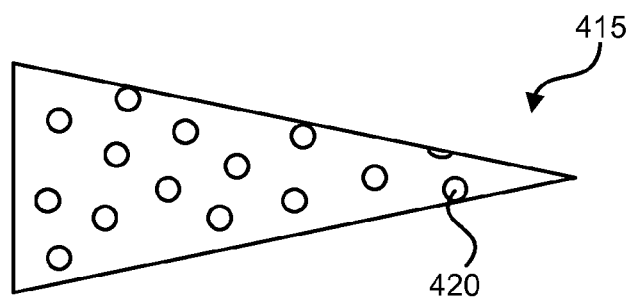
Figure 4C:
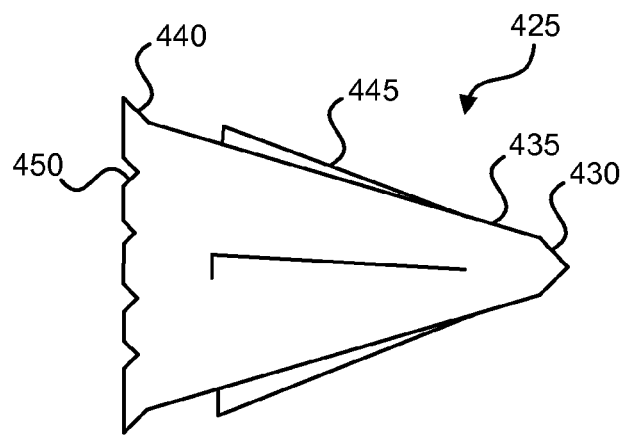

FIGS. 4a-4c are side views of tapered conversion rods in accordance with embodiments. As described above, the conversion rod may comprise a smooth tapered surface or may comprise a textured tapered surface. While FIGS. 1-2 illustrated tapered conversion rods comprising smooth surfaces, FIGS. 4a-4c illustrate tapered conversion rods having textured surfaces. Various textures and configurations can be used. For example, the surface may include knurling, bumps, divots, depressions, grooves, ribs, etc., as may be useful to further induce vortical flows.

Referring to FIG. 4a, a tapered conversion rod 405 is shown comprising a plurality of tapers. The plurality of tapers includes a main taper and a curved tip near a narrow end of the conversion rod. The curved lines 410 wrapping around the tapered conversion rod represent grooves or ribs formed in/on the surface of the tapered conversion rod. In one aspect, the grooves or ribs can be formed at a constant, linear curvature around the tapered conversion rod. In another aspect, the grooves or ribs can be formed at a varying rate of curvature. For example, experimental results indicate that the vortical or helical flow of the fuel around the tapered conversion rod changes as the fuel progresses flowing from one end of the tapered conversion rod to another. Specifically, the flowing fuel can cause spiral markings along the tapered conversion rod. Such markings can be used to determine where and how to structure the ribs or grooves. Forming fuel flow paths using ribs or grooves can further enhance the flow of the fuel around the tapered conversion rod and thus can further enhance the conversion of the fuel to treated fuel.

Referring to FIG. 4b, a tapered conversion rod 415 is shown having a single taper extending along an entire length of the tapered conversion rod. The tapered conversion rod comprises a point on one end and a flat or depressed surface on an opposite, wider end. The circles 420 on the tapered conversion rod of FIG. 4b represent bumps or divots formed on the tapered conversion rod. The bumps or divots can be formed at predetermined intervals and/or in a predetermined pattern. In another aspect, the bumps or divots can be formed and spaced randomly along the tapered conversion rod. The bumps or divots can affect the flow of fuel and the pressure of the fuel vapors as the fuel progresses from the narrower end to the wider end of the tapered conversion rod. Referring to FIG. 4c, a tapered conversion rod 425 is shown having a plurality of tapers at different angles. A first taper 430 is near the narrow end and is tapered at a sharper or greater angle than a taper angle of a second or main taper portion 435. For example, the first taper can comprise an angle of 35° or 45° or more. Example angles of the main taper portion have been set forth above. The tapered conversion rod of FIG. 4c includes a third taper 440 near the wide end. The third taper of FIG. 4c has an angle greater than the angle of the main taper. However, the angle of the third taper can also be less than the angle of the main taper, and can even include a negative angle to produce a negative taper. The transition between the first and second or second and third tapers can be an abrupt, sharp change as illustrated in the figure, or can be rounded, such as the transition from the curved tip of FIG. 4a to the main taper. The tapered conversion rod can include protrusions or fins 445 which can extend from a surface of the tapered conversion rod. Depending on the configuration of the protrusions or fins, the protrusions or fins can assist in guiding the flow of the fuel through the conversion tube. In another aspect, the protrusions or fins can be used to prevent rotation of the tapered conversion rod within the conversion tube so that the fuel is rotated around a substantially stationary conversion rod. In a further aspect, the wide end of the conversion rod can include slots or passages 450 for enabling at least some of the fuel to flow through the slots to a depression (not shown) where plasma can form. The passages can also enable heat from the plasma to reach the fuel flowing around the conversion rod to assist in heating the fuel in preparation for conversion to plasma.

Figure 5:
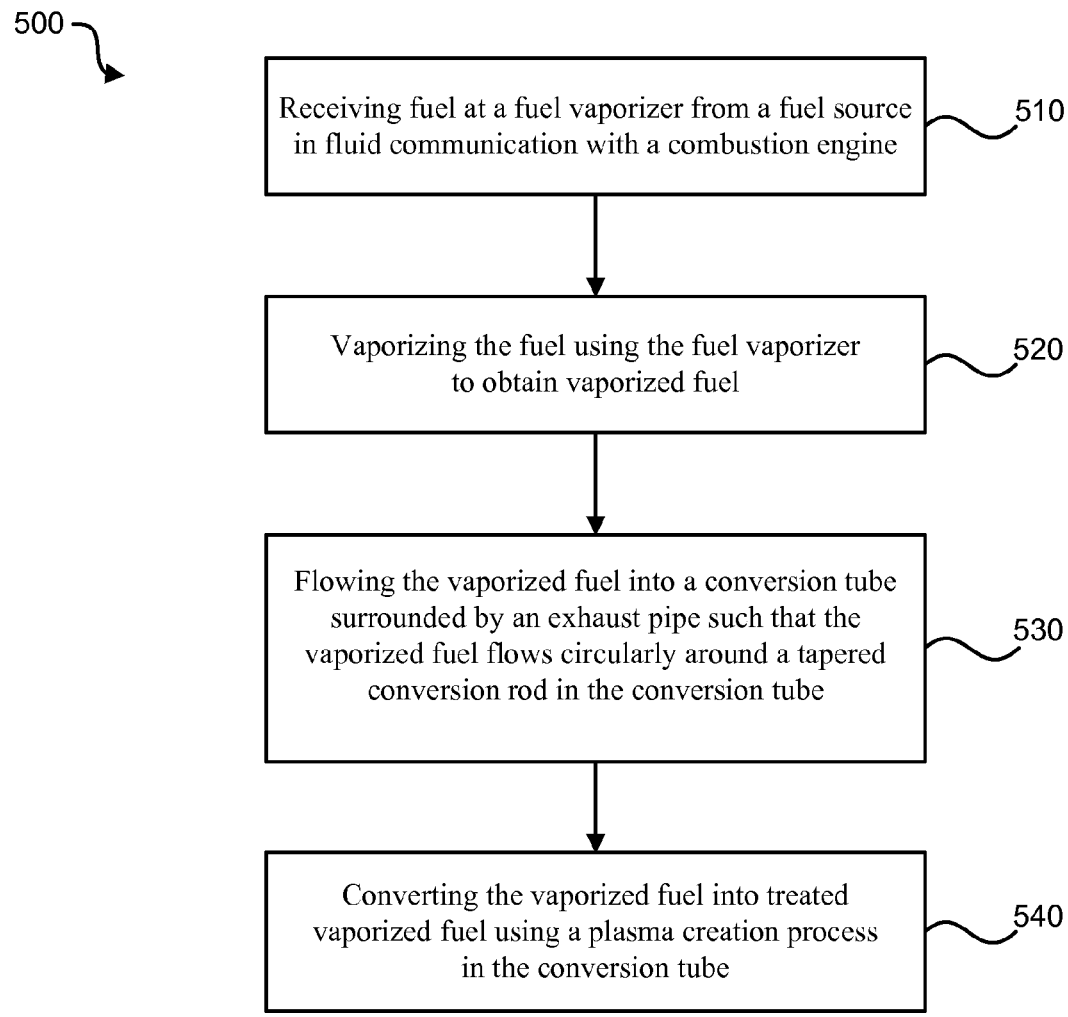
FIG. 5 is a flow diagram of a method for pretreating fuel for combustion in accordance with an embodiment.

Referring to FIG. 5, a flow diagram of a method 500 for pretreating fuel for combustion is illustrated in accordance with an embodiment. The method can include receiving 510 fuel at a fuel vaporizer from a fuel source in fluid communication with a combustion engine. The fuel can be first delivered to the fuel source, such as by pumping, pouring, or otherwise inserting fuel into a gas tank or other fuel container (e.g., fuel source). In another aspect, the fuel source can be a pipe for providing a continuous supply of fuel, such as a gas line or the like which receives fuel from a large public fuel supply.

The fuel can be vaporized 520 using the fuel vaporizer to obtain vaporized fuel. The vaporized fuel can subsequently be flowed 530 into a conversion tube surrounded by an exhaust pipe. The vaporized fuel can be caused to flow circularly around a tapered conversion rod in the conversion tube. Also, the tapered conversion rod can be caused to float within the conversion tube while flowing the vaporized fuel. The floating of the conversion rod has been described above. The method can also include converting 540 the vaporized fuel into treated vaporized fuel using a plasma creation process in the conversion tube.

The method can also include heating the exhaust pipe prior to flowing the vaporized fuel into the conversion tube to facilitate the plasma creation process. For example, the exhaust pipe can be heated by flowing exhaust through the exhaust pipe in an opposite direction of the vaporized fuel flow. Although the heating of the vaporized fuel has been primarily described as using heat exhaust to inductively heat the fuel, the conversion rod and conversion tube can alternately be outside of the exhaust pipe and can use an alternate heat source for heating. For example, the engine can include an electric or fuel-powered heater for heating the conversion tube which at least partially surrounds the conversion tube.

The method can include forming a plasma from the fuel near a wider end of the tapered conversion rod. The plasma can be formed at least in part due to heat from the exhaust. Also, pressure and/or magnetic or electrical fields resulting from the opposite vortical flows can contribute to the formation of the plasma. As plasma, impurities and other elements of the fuel can be purified or eliminated from the fuel to result in the treated fuel.

After the fuel has been converted to plasma and treated, the fuel can be cooled. Cooling can occur naturally by flowing the fuel out of the conversion rod and away from the pressure and vortical flows of the conversion tube. In another aspect, an air valve can provide air to mix with the treated fuel to cool the treated fuel before the treated fuel reaches an intake of the combustion engine. After the fuel is treated, the method can include dispersing the treated vaporized fuel from the conversion tube into an intake manifold of the combustion engine.

The fuel pretreater apparatus can be implemented in a wide variety of applications. For example, the fuel pretreater apparatus may be used in motor vehicles, lawnmowers, furnaces, trains, power generators, etc. In other words, the fuel pretreater apparatus may be used to provide improved performance and efficiency in virtually any fuel burning apparatus while substantially reducing the amount of harmful emissions from such fuel burning apparatuses. Experimental results suggest as much as a 300% in fuel mileage over other engines.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A fuel pretreater apparatus for pretreating fuel for combustion, comprising:
  a conversion tube configured for vaporized fuel to flow therethrough, wherein the conversion tube comprises an intake end for receiving the vaporized fuel and an outlet end for dispersing the vaporized fuel, the conversion tube comprising a hollow tapered interior wall having a narrower diameter near the intake end and a wider diameter near the outlet end; and
  a tapered conversion rod located inside the conversion tube, wherein the tapered conversion rod is conically tapered along at least one half of a length of the tapered conversion rod, the tapered conversion rod comprising a narrow end corresponding to the narrower diameter of the conversion tube near the intake end and a wider end corresponding to the wider diameter of the conversion tube near the outlet end.

2. A fuel pretreater apparatus as in claim 1, further comprising an exhaust conduit substantially enclosing the conversion tube such that when heated exhaust passes through the exhaust conduit the conversion tube is heated.

3. A fuel pretreater apparatus as in claim 1, wherein the exhaust conduit encloses the conversion tube such that flow of the vaporized fuel is in a direction opposite to a direction of a flow of the heated exhaust in the exhaust conduit.

4. A fuel pretreater apparatus as in claim 1, wherein the tapered conversion rod is tapered along a majority of the length.

5. A fuel pretreater apparatus as in claim 1, wherein the tapered conversion rod comprises a plurality of tapers at different angles.

6. A fuel pretreater apparatus as in claim 5, wherein a first taper of the plurality of tapers is near the narrow end and comprises a greater taper angle than a taper angle of a second taper of the plurality of tapers near the wide end.

7. A fuel pretreater apparatus as in claim 5, wherein the plurality of tapers comprises a main taper extending along a majority of the length of the tapered conversion rod and a tip taper comprising a rounding of a tip of the tapered conversion rod at the narrow end.

8. A fuel pretreater apparatus as in claim 1, wherein the tapered conversion rod comprises a smooth surface.

9. A fuel pretreater apparatus as in claim 1, wherein the tapered conversion rod comprises a textured surface.

10. A fuel pretreater apparatus as in claim 1, wherein the tapered conversion rod comprises a depression formed in a face of the wide end.

11. A fuel pretreater apparatus as in claim 10, wherein the depression comprises a semi-spherical depression and provides an expanded space for plasma to form.

12. A fuel pretreater apparatus for pretreating fuel for combustion, comprising:
- a combustion engine;
- a fuel source in fluid communication with the engine;
- a fuel vaporizer configured to vaporize fuel from the fuel source;
- an exhaust pipe configured to provide an outlet for exhaust from fuel combusted in the combustion engine;
- a conversion tube passing through the exhaust pipe such that when heated exhaust passes through the exhaust pipe the conversion tube is heated, wherein the conversion tube is configured to receive vaporized fuel from the fuel source, the conversion tube comprising:
  - an intake end for receiving the vaporized fuel and an outlet end for dispersing the vaporized fuel; and
  - a hollow tapered interior wall having a narrower diameter near the intake end and a wider diameter near the outlet end; and
- a tapered conversion rod removably placed inside the conversion tube, wherein the tapered conversion rod is conically tapered along at least one half of a length of the tapered conversion rod, the tapered conversion rod comprising a narrow end corresponding to the narrower diameter of the conversion tube near the intake end and a wide end corresponding to the wider diameter of the conversion tube near the outlet end.

* * * * *